United States Patent [19]

Biondetti

[11] 4,023,480
[45] May 17, 1977

[54] APPARATUS FOR CONTROLLING A DEFLECTION COMPENSATING PRESS ROLL OF A ROLLING MILL

[75] Inventor: Mario Biondetti, Schio, Italy

[73] Assignee: Escher Wyss Limited, Zurich, Switzerland

[22] Filed: Feb. 26, 1976

[21] Appl. No.: 661,566

[30] Foreign Application Priority Data

Mar. 4, 1975   Switzerland .................. 2733/75

[52] U.S. Cl. .................. 100/47; 100/162 B; 100/170; 29/113 AD; 29/116 AD; 72/243; 72/20

[51] Int. Cl.² .................. B30B 15/14; B30B 3/04

[58] Field of Search .......... 100/47, 162 B, 170; 29/113 AD, 116 AD, 113 R, 116 R; 72/241, 243, 20

[56] References Cited

UNITED STATES PATENTS

| | | | |
|---|---|---|---|
| 3,077,800 | 2/1973 | Taylor | 72/243 X |
| 3,119,324 | 1/1964 | Justus | 100/170 |
| 3,276,102 | 10/1966 | Justus | 29/116 AD |
| 3,802,044 | 4/1974 | Spillmann et al. | 29/113 AD |

Primary Examiner—Peter Feldman

Attorney, Agent, or Firm—Pennie & Edmonds

[57] ABSTRACT

An apparatus for controlling a deflection compensating press roll of a rolling mill having a pair of press rolls at least one of which is a deflection compensating roll having a support core, a roll shell rotatably mounted about the core, bearing means disposed between the core and the roll shell adjacent the shell ends, a plurality of support devices engaged between the core and the roll shell to exert forces therebetween and pressure means for pressing the rolls against each other, the control apparatus comprises a frame, a movable member mounted in the frame, means coupled with the support devices and the pressure means and responsive to the forces exerted thereby for exerting a force on the movable member which simulates the forces exerted by the support devices and the pressure means so that the movable member is maintained in an equilibrium position when the forces exerted by the support devices and the pressure means are substantially in equilibrium, means for sensing displacement of the movable member from the equilibrium position and means responsive to the sensing means for restoring the forces exerted by the support devices and pressure means substantially to equilibrium.

20 Claims, 4 Drawing Figures

APPARATUS FOR CONTROLLING A DEFLECTION COMPENSATING PRESS ROLL OF A ROLLING MILL

The present invention relates to rolling mills employing one or more deflection compensating press rolls, and more particularly to an apparatus or controlling the deflection compensating roll.

Known deflection compensating press rolls include a cylindrical roll shell rotatably disposed about a support core on roller bearings mounted on the ends thereof. Deflection of the roll is controlled by hydraulically operated support devices engaged between the support core and the roll shell which bear against the inside surface of the shell. One such press roll utilizing a plurality of hydrostatic elements in the form of pistons disposed in cylinders formed in the core is described in U.S. Pat. No. 3,802,044. The rolls of the rolling mill are pressed against each other by pressure elements such as hydraulically operated pistons acting on the ends of the support core of the deflection compensating roll or on the mating roll. In such prior art rolling mills it is difficult to control the forces exerted by the support devices acting between the core and roll shell and the pressure elements pressing the two rolls together with a sufficient degree of precision to achieve an equilibrium of the forces so that loading or at least excessive loading of the end roller bearings is avoided.

The object of the present invention is to obviate this disadvantage and to provide an apparatus for controlling a deflection compensating roll which automatically adjusts the forces so that they are in equilibrium, or at least in approximate equilibrium, thereby minimizing the load on the end bearings thereof while preserving the deflection compensation.

SUMMARY OF THE INVENTION

In accordance with the present invention, the rolling mill includes a pair of press rolls, at least one of which is a deflection compensating roll having a support core, a roll shell rotatably mounted on the core and at least one support device engaged between the core and the roll shell to exert a force against the inside surface of the roll shell and to press it against the mating roll. The deflection compensating roll is also provided with bearing means such as a pair of roller bearings mounted at both ends of the support core between the core and the roll shell and pressure means for pressing the rolls of the mill against each other. The pressure means may act either on the ends of the core of the deflection compensating roll or on the journals of the mating roll. Since in either arrangement the force pressing the two rolls together opposes the forces exerted by the support devices, if the forces exerted by the support devices and the pressure means are in equilibrium, the load on the end bearings of the deflection compensated roll will be at a minimum.

The control apparatus for effecting an equilibrium of forces in the rolling mill comprises a frame or housing, a movable member disposed in the frame and means for exerting a force on the movable member. The force exerting means is coupled with the support devices and the pressure means and is responsive to the forces exerted thereby so that the force exerted on the movable member by the force exerting means simulates the forces exerted by the support devices and pressure means and maintains the movable member in a position of equilibrium when those forces are in equilibrium.

The control apparatus also includes means for sensing displacement of the movable member from the equilibrium position when the forces exerted by the support devices and pressure means depart from equilibrium and means responsive to the sensing means for restoring the forces exerted by the support devices and pressure means to equilibrium.

In addition, the control apparatus may be provided with a pressure element to exert a force on the movable member which simulates the deadweight of the roll. This element may preferably be a spring with adjustable spring tension disposed between the movable member and the frame. By adjusting the spring tension it is possible to produce, if desired, a bow in the roll shell of the deflection compensating roll as well as to compensate for the deadweight of the roll.

Preferably the force exerting means for simulating the forces exerted by the support devices and the pressure means may include a plurality of pressure elements which exert opposing forces on the movable member. In such an arrangement, the pressure elements acting on the movable member in one direction are coupled with and responsive to the pressure means whereas the elements acting on the member in the opposite direction are coupled with and responsive to the support devices.

The pressure elements may advantageously be operated by a pressurized fluid the pressure of which is dependent on the pressure of the fluid acting on the support devices and the pressure means. Hence, when the opposing forces exerted by the support devices and the pressure means of the rolling mill are in equilibrium, the forces exerted by the pressure elements on the movable member will also be in equilibrium. If thereafter, the forces exerted by either the support devices or the pressure means changes, the forces exerted on the movable member will also depart from equilibrium causing the movable member to move from its equilibrium position. In such an arrangement, the forces may be restored to equilibrium by means responsive to the sensing means for regulating the pressure of the fluid acting on the pressure means or on the support devices.

The pressure elements utilized to simulate the forces in the roll may preferably be in the form of bellows engaged between the frame and the movable member on opposite sides thereof, the bellows being actuated by a pressurized fluid the pressure of which is dependent upon the pressure of the fluid acting on the support devices and the pressure means. This arrangement simplifies the construction of the control apparatus and results in essentially friction-free operating without the need for moving seals.

For deflection compensating rolls utilizing hydraulic fluid to operate the support devices and pressure means, a pressurized gas, for example compressed air, may be used to actuate the pressure elements. The hydraulic fluid conduit supplying fluid to the support devices and the pressure means of the press roll may be provided with pneumatically actuated fluid pressure control valves which are connected with the pressure elements of the control apparatus so that the gas acting on these elements also acts on the valves. In this way the forces acting on the movable member can be made to simulate the forces exerted by the support devices and pressure means since the forces exerted by the pressure elements of the control apparatus, and the forces exerted by the support devices and pressure means of the rolling mill are all dependent on the pressure of the gas acting on the pressure elements and the control valves. This type of arrangement advantageously results in a high degree of sensitivity and at the same time minimizes hydraulic fluid losses.

When pressurized gas is used as the pressure medium for actuating the pressure elements of the control apparatus, the sensing means may advantageously include blow tubes connected to the source of pressurized gas via a throttling element and connected in parallel with the associated pressure elements and associated hydraulic fluid control valves. The nozzles of the blow tubes are positioned adjacent the movable member with a gap therebetween so that movement of the movable member toward or away from the blow tubes will result in a corresponding increase or decrease in the pressure of the gas in the blow tubes and produce a corresponding change in the pressure of the gas acting on the associated pressure element and control valves. In this way the blow tubes serve to sense movement of the movable member and in conjunction with the associated control valves to adjust the forces exerted by the associated support devices or pressure means to restore the stresses to equilibrium.

Preferably the movable member may be a plate pivotably mounted in the frame of the control apparatus. The force exerted on the plate by the individual pressure elements can then be varied by varying their position with respect to the pivot axis. Thus, pressure elements of the same size can be used to produce different forces depending on the length of the lever arms through which they act.

The deflection compensating roll may advantageously be provided with support devices which preferably are in the form of hydrostatic support elements and movably disposed in the support core of the roll and means for regulating the forces exerted by the individual support elements or groups of elements hydraulically connected together. Each of the groups of hydrostatic support elements are coupled with one of the pressure elements of the control apparatus so that each element simulates the aggregate force exerted by the associated group of support elements. The pressure means in such an arrangement may advantageously include a pair of pressure members, such as hydraulically operated pistons, acting on the ends of the core of the deflection compensating roll or on the journals of the mating roll. Each of the pressure members is coupled with one of a pair of pressure elements which act on the movable member to oppose the forces of the pressure elements coupled with the roll shell support elements.

In such an arrangement, the forces exerted by the groups of support elements can be individually regulated to obtain a desired nip pressure profile axially of the rolls with the control apparatus automatically adjusting the forces exerted by the pressure members acting on the ends of the core so that the forces are in equilibrium and the bearing means float free of load.

BRIEF DESCRIPTION OF THE DRAWINGS

Other objects, features and advantages of the present invention will be apparent in the following description thereof which is provided by way of example only with reference to the accompanying drawings, in which.

DESCRIPTION OF THE PREFERRED EMBODIMENT

Figure 1:
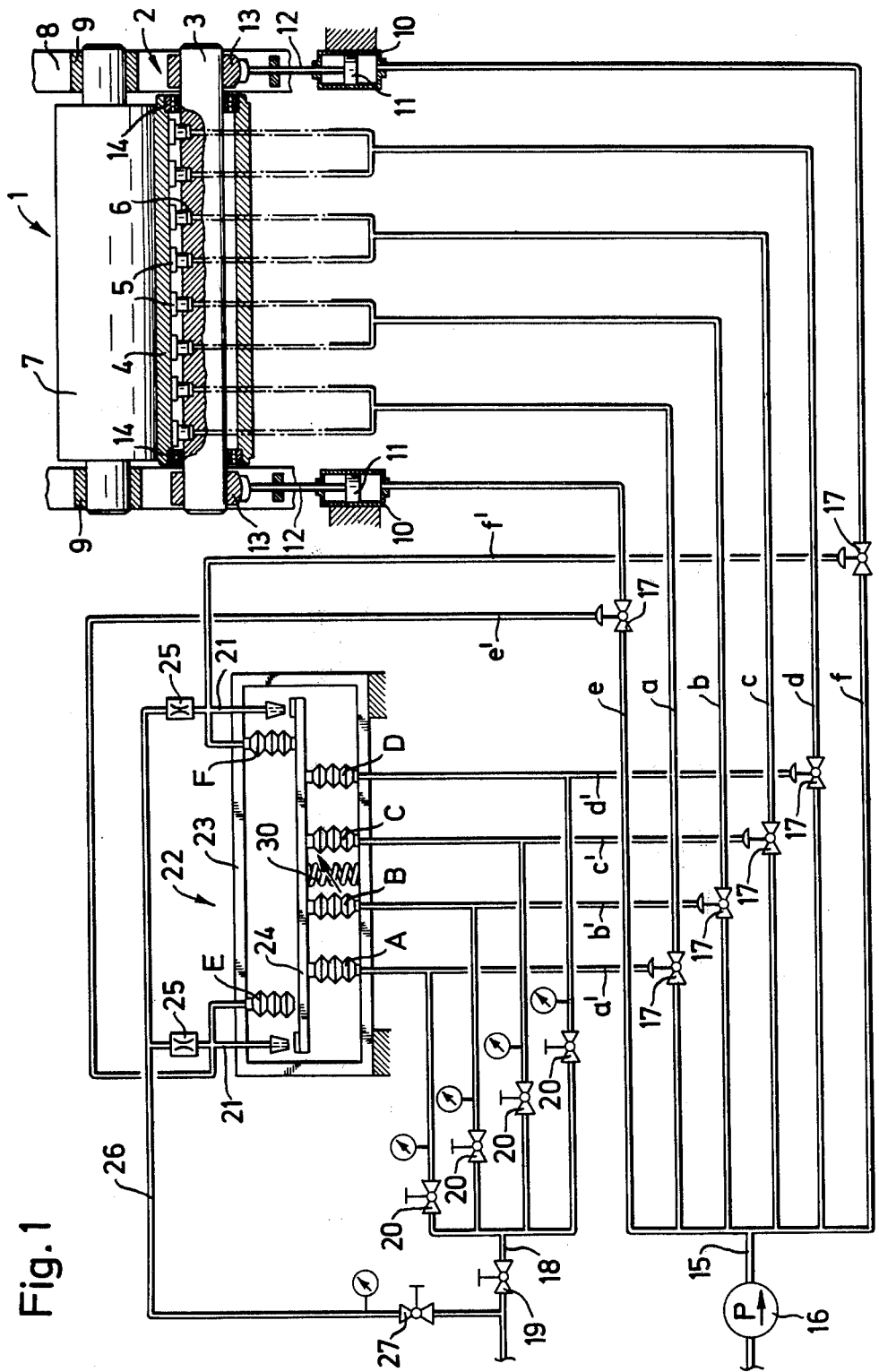
FIG. 1 diagrammatically illustrates a rolling mill including a deflection compensating press roll and the control apparatus according to the invention.

Referring now to FIG. 1, the rolling mill 1 there shown includes a deflection compensating roll 2 having a central support core 3, a cylindrical roll shell 4 rotatably mounted about core 3, and a plurality of support devices 5 engaged between the core 3 and the roll shell 4. The support devices 5 may preferably be hydrostatic support elements of the type described in U.S. Pat. No. 3,802,044 which are in the form of pistons provided with bearing pads having recesses formed therein which are supplied with hydraulic fluid so that the roll shell slides freely on a hydrostatic fluid cushion while rotating. The support elements or pistons 5 are seated in cylinders 6 formed in support core 3 and exert a force against the interior surface of the roll shell 4 pressing it against the mating roll 7. The deflection compensating roll 2 is also provided with a pair of roller bearings 14 mounted on each end of support core 3 between the core and the roll shell 4.

A mating roll 7, journaled in fixed bearings 9 mounted in frame 8, cooperates with the deflection compensating roll 2 to form a pressure nip therebetween. The deflection compensating roll 2 is pressed against the mating roll 7 by a pair of pistons 11 seated in sealing-tight relationship in cylinders 10. The pistons 11 bear via piston rods 12 against guide elements 13 by means of which the core 3 is guided in the frame 8.

As shown in FIG. 1 the cylinders 6 of roll 2 are combined into four groups each group containing two cylinders which are connected to an associated one of the hydraulic fluid branch lines $a$, $b$, $c$, or $d$. The combination shown in FIG. 1 is for illustration purposes since usually each group will contain more than two hydrostatic support elements 5 and cylinders 6. It is also possible to use a different number of groups or to connect each of the cylinders to a separate branch line rather than combining them into groups.

The internal cylinders 6 of roll 2 are connected via branch lines $a$, $b$, $c$ and $d$ to a hydraulic fluid delivery line 15 of a hydraulic pump 16. Similarly the two end cylinders 10 are each connected by their respective branch lines e and f to the same delivery line 15 and pump 16. Each of the branch lines a through f includes a pneumatically operated pressure control valve 17 which regulates the pressure of the hydraulic fluid supplied to the associated cylinder or cylinders. The pneumatic control parts of valves 17 in branch lines $a$ to $d$ are respectively connected to pneumatic signal or control lines $a'$ to $d'$. Pneumatic control lines $a'$, $b'$, $c'$ and $d'$ connect with a pressurized gas delivery line 18 which contains a manually adjustable pressure control valve 19. Each of the lines $a'$ to $d'$ is, moreover, provided with a manually adjustable pressure control valve 20. The penumatic control parts of valves 17 in lines e and f are respectively connected to pneumatic control lines $e'$ and $f'$ which connect with one of a pair of blow tubes 21 in a control apparatus generally indicated at 22.

The control apparatus 22 includes a frame or housing 23 and a movable beam 24 disposed therein. Between the housing 23 and the beam 24 on one side thereof, are positioned bellows A, B, C and D which are connected respectively to the control lines $a'$, $b'$, $c'$ and $d'$. Bellows E and F are positioned between the housing 23 on the other side of the beam 24 and are connected respectively by control lines $e'$ and $f'$ to the associated blow tubes 21.

Each of the blow tubes 21 connects via a throttle valve 25 with a common compressed air line 26 which is connected to the main pressurized air delivery line and which contains a manually adjustable pressure control valve 27. The nozzles of the blow tubes 21 are positioned above beam 24, as viewed in FIG. 1, with a slight gap therebetween so that when the beam 24 moves toward or away from the blow tubes 21, the resultant decrease or increase of the gap produces a corresponding increase or decrease in the pressure of the air in the blow tubes 21. Since the blow tubes 21 are connected with bellows E and F and via control lines $e'$ and $f'$ with the associated valves 17, the change in the pressure of the air in blow tubes 21 will result in a corresponding change in the pressure of the air acting on the bellows E and F and the associated valves 17.

The relationships between the rolling mill 1 and the control apparatus 22 are so chosen that the beam 24 and bellows A through F operate to simulate the forces existing in the rolling mill. Thus, with the proper adjustment of the pressure control valves 17 and with the proper dimensioning and positioning of the bellows A to F, the forces exerted by the bellows through their lever arms on beam 24 may be made to be proportional to the forces in the roll mill 1 as modified by their associated lever arms. Under these conditions, the aggregate force exerted on the beam 24 by bellows A, B, C, and D corresponds to the resultant force exerted by the associated groups of shell support elements 5 and the resultant force exerted by the bellows E and F on beam 24 corresponds to the resultant force exerted by the associated pistons 11.

Therefore, when the forces exerted by bellows A to F on beam 24 are in equilibrium, the bearings 14 between the roll shell 4 and the support core 3 will be relieved of load since the equilibrium condition of beam 24 corresponds to an equilibrium of the forces exerted by pistons 5 and pistons 11. If thereafter, the force exerted by one of the groups of pistons 5 is changed, for example by manually changing the setting of one of the control valves 20, the beam will depart from its equilibrium position since the force exerted by the corresponding one of the bellows A, B, C, or D will have changed. The movement of the beam 24 from its equilibrium position will automatically entail a change in the pressure in blow tubes 21 as a result of the change in the gap due to the motion of the beam 24 toward or away from the nozzles of the blow tubes. The pressure change in the blow tubes 21 will produce a corresponding increase or decrease of the pressure at bellows E and F and, via control lines $e'$ and $f'$, will effect a corresponding adjustment of the control valves 17 in lines e and f thereby adjusting, again in a corresponding manner, the pressure of the hydraulic fluid supplied to cylinders 10. In this manner the forces exerted by pistons 11 are automatically adjusted to the new condition imposed by the manual change in the setting of one of the valves 20 until equilibrium is restored.

The control apparatus 22 thus permits the forces exerted by the groups of pistons 5 to be individually controlled by means of valves 20 in order to obtain a desired nip pressure profile by automatically adjusting the forces exerted by the pistons 11 so that equilibrium of forces is maintained thereby maintaining bearings 14 substantially free of load.

To compensate for the deadweight of the roll 2, the control apparatus 22 is provided with a spring 30, having an adjustable spring tension, disposed between the beam 24 and housing 23. The spring 30 acts on the beam 24 in the same direction as bellows A, B, C and D since in the rolling mill 1 the force exerted by pistons 5 together with the weight of the roll 2 is borne by the pistons 11.

Since the weight of the roll 2 is distributed symmetrically in the present example and therefore its center of gravity is located in the center thereof, the spring 30 is disposed in the common plane of symmetry of the bellows A to F. Of course if the center of gravity of the roll is at some different position, then the position of the spring with respect to the bellows A to F must also be changed accordingly.

The force of the spring 30 may, if desired, be adjusted so that its influence on beam 24 is less or greater than that which would correspond to the weight of the roll. This will then produce a corresponding sag or bow in the roll shell and also loading of the bearings 14. However, since the control apparatus during the operation of the rolling mill maintains the forces exerted by the support elements 5 and pistons 11 in equilibrium, the loading on bearings 14 will be maintained at the minimum value required to produce the desired degree of bow in the roll shell. Such a bow is frequently required when it is desired that the roll shell 4 follow a sag in the mating roll 7.

Although, in the present example the pistons 11 are shown as acting on the support core 3, the two press rolls may also be pressed against each other by pistons acting on the journals of the mating roll 7 with the core 3 of the deflection compensating roll 2 being rigidly mounted in frame 8.

Figure 2:
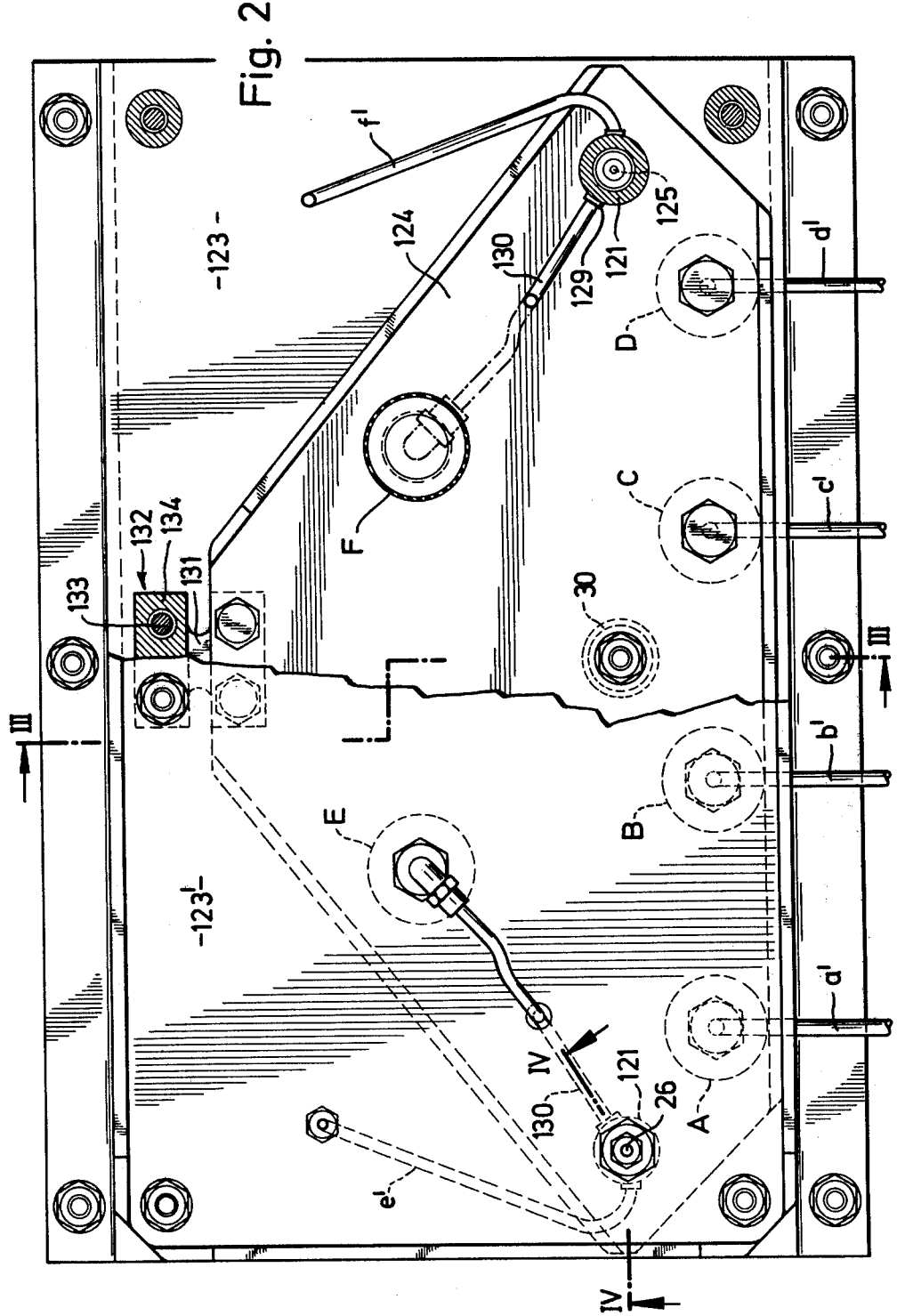
FIG. 2 is an elevation view and partial sectional view taken on line II—II of FIG. 3 showing the preferred embodiment of the control apparatus.
Figure 3:
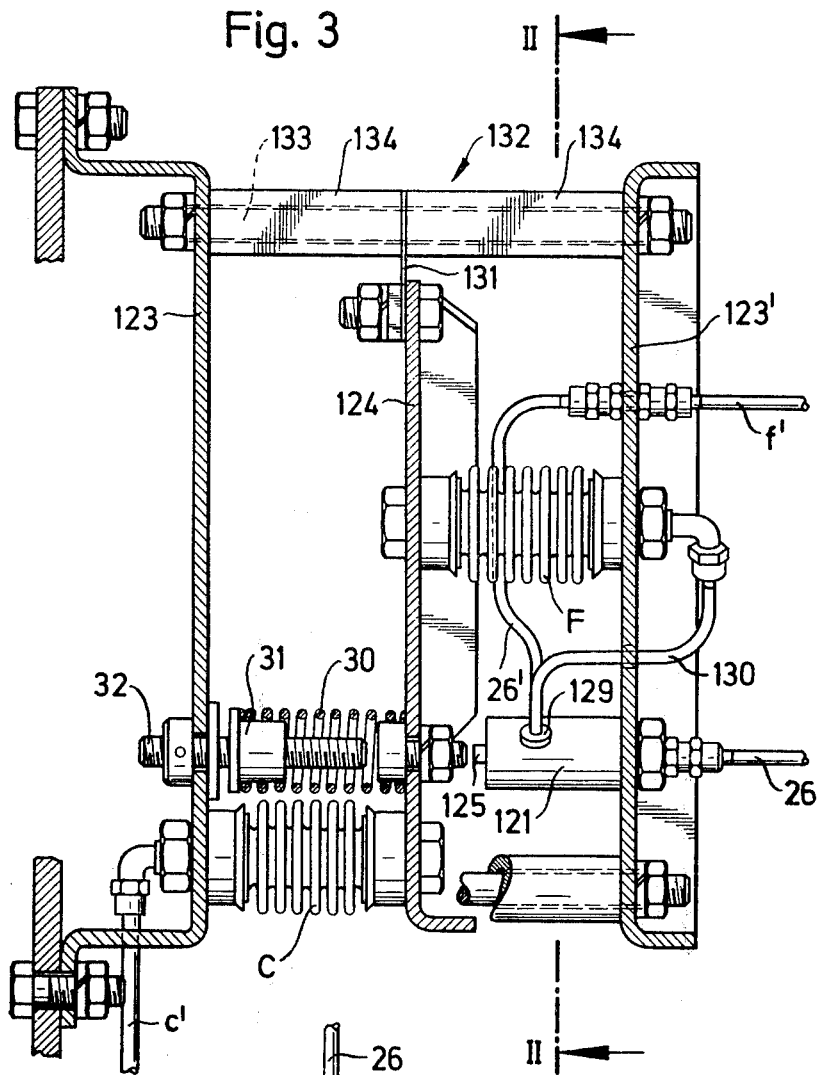
FIG. 3 is a sectional view taken on the line III—III of FIG. 2.
Figure 4:
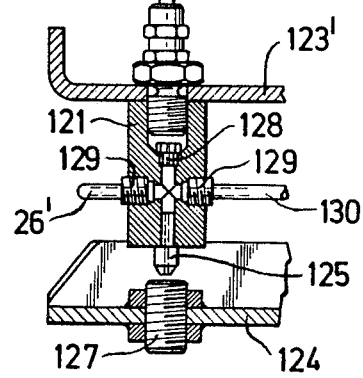
FIG. 4 is a sectional view taken along line IV—IV of FIG. 3.

FIGS. 2 to 4 show a preferred form of the control apparatus which, however, corresponds in principle and operates in a manner similar to that of the control apparatus 22 of FIG. 1.

The control apparatus of FIGS. 2 to 4 includes a movable plate 124 disposed in a housing between two fixed plates 123 and 123'. Plate 124 is supported by a thin resilient plate 131 clamped between the two halves 134 of a pair of two-part columns 132 which are fastened to plates 123 and 123' by bolts 133. The bellows A, B, C and D, connected respectively to control lines $a'$, $b'$, $c'$ and $d'$, are positioned between the fixed plate 123 and the movable plate 124 on one side thereof and bear on the plate 124 in one direction whereas bellows E and F are positioned between the fixed plate 123' and plate 124 and bear on the latter in the opposite direction. The resilient plate 131, located at the edge of the plate 124 in the plane of symmetry of the bellows A to F, thus forms a pivot about which the plate 124 pivots.

Each of the bellows E and F is connected by an air line 130 to one of a pair of sensor valves 121 which are connected with a common compressed air line 26. Each of the sensor valves 121 includes a nozzle 125 adjacent the movable plate 124 and a throttling valve 128 disposed in the inlet and of a central bore which extends through the housing of valve 121 and connects the nozzle 125 with the air line 26. Elements 127 threaded into plate 124 are provided for adjusting the gap between the nozzles 125 and the plate 124.

The bellows E and F connect with the associated sensor valves 121 via lines 130 which are connected by fitting 129 to the central bores of the valves 121 at a position between the nozzles 125 and the throttle valves 128. Similarly the control lines $e'$ and $f'$ connect with their associated valves 121 via lines 26' which are also connected by fittings 129 to the central bore of the valves between the nozzles 125 and throttle valve 128. Thus, each of the sensor valves 121, is connected with the associated bellows E or F via line 130 and with the associated control valve 17 via line 26' and, moreover, communicates with the common compressed air line 26 via throttle valve 128.

The embodiment of FIGS. 2 to 4 operates in principle in the same way as the control apparatus 22 of FIG. 1. However, since plate 124 is pivotally mounted in the housing the embodiment of FIGS. 2 to 4 has the advantage in that the lever arms of the bellows A through F can be changed not only in a single direction as with the beam 24 of FIG. 1, but also radially with respect to pivot 131. Thus, if in the embodiment of FIGS. 2 to 4, the bellows E and F are positioned closer to the pivot 131 than bellows A to D, the lever arms of the former are shorter and therefore less effective than those of the bellows A to D. This embodiment, therefore, permits a greater degree of flexibility in the design of the control apparatus. For example, all the bellows of the apparatus can be of the same size and the force exerted by the individual bellows on the plate 124 can be controlled by the position of the bellows with respect to pivot 131.

The spring 30 is attached to the plate 123 by bolt 32 and is provided with a threaded element 31 for adjusting the spring force. The spring 30 acts on the plate 124 to simulate the deadweight of the roll in the same manner as heretofore described with respect to the control apparatus 22 of FIG. 1.

The control apparatus according to the present invention although hereinabove described with respect to a pneumatic control system may also be used in a purely hydraulic system. In such a system, the bellows A to F may be connected directly with the hydraulic lines a to f and hydraulic control valves of the spool type substituted for the pneumatic sensing valves 121 or the blow tubes 21.

Although the present invention has been described in relation to a presently preferred embodiment, the invention itself is not limited thereto but rather comprehends all modifications of that embodiment falling within the spirit and scope of the appended claims.

I claim:
1. An apparatus for controlling a deflection compensating press roll having a support core, a roll shell rotatably mounted about the support core, bearing means disposed between the shell and the core adjacent the shell ends, a plurality of support devices engaged between the core and the roll shell to exert forces therebetween, and pressure means for exerting forces on the core which oppose the forces exerted by said support devices, said control apparatus comprising a frame, a movable member disposed in said frame, means coupled with said support devices and said pressure means and responsive to the forces exerted thereby for exerting forces on said movable member which simulate the forces exerted by said support devices and said pressure means so that said movable member is maintained in a position of equilibrium when said forces exerted by said support devices and said pressure means are substantially in equilibrium, means for sensing displacement of said movable member from said equilibrium position, and means responsive to said sensing means for restoring the forces exerted by said support devices and said pressure means substantially to equilibrium so that loading of said bearing means is substantially minimized.

2. Apparatus according to claim 1 including further means for exerting a force on said movable member to simulate the deadweight of said press roll.

3. Apparatus according to claim 2 wherein said further force exerting means includes a spring with an adjustable spring tension, said spring being disposed between said frame and said movable member.

4. Apparatus according to claim 1 wherein said movable member is a plate pivotally mounted in said frame.

5. Apparatus according to claim 1 wherein said pressure means includes a pair of pressure members acting on the ends of said support core.

6. Apparatus according to claim 1 wherein said means for exerting forces on said movable member includes first and second pressure elements for exerting opposing forces on said movable member so that the member is in said equilibrium position when said forces are in equilibrium, and means for coupling said first and second pressure elements respectively to said pressure means and said support devices so that the forces exerted by said first and second pressure elements on said movable member are respectively dependent on the forces exerted by said pressure means and support devices.

7. Apparatus according to claim 6 wherein said first and second pressure elements are operated by a pressurized fluid acting thereon and wherein said coupling means includes a first means for regulating forces exerted by said pressure means, said first regulating means being in fluid communication with said first pressure elements and responsive to the pressure of the fluid acting thereon, and a second means for regulating the forces exerted by said support devices, said second regulating means being in fluid communication with said second pressure elements and responsive to the pressure of said fluid acting thereon.

8. Apparatus according to claim 7 wherein said fluid is a pressurized gas and wherein said sensing means includes a blow tube having a nozzle positioned adjacent said movable member, said blow tube being in fluid communication with said first pressure element and said first regulating means, said apparatus including a conduit connecting said blow tube with a source of said pressurized gas and a throttling element disposed in said conduit.

9. Apparatus according to claim 6 wherein said first and second pressure elements each include at least one bellows positioned between said frame and said movable member.

10. Apparatus according to claim 7 further including a conduit for connecting said second pressure element and said second regulating means with a source of pressurized fluid and additional means for regulating the pressure of said fluid in said conduit.

11. A rolling mill comprising at least two press rolls at least one of which is a deflection compensating press roll having a support core, a roll shell rotatably mounted about said support core, bearing means disposed between said core and said roll shell adjacent the shell ends, a plurality of support devices engaged between the core and the shell for exerting forces therebetween, pressure means for pressing said rolls against each other and a control apparatus having a frame, a movable member disposed in said frame, means coupled with said support devices and said pressure means and responsive to the forces exerted thereby for exerting forces on said movable member which simulate the forces exerted by said support devices and said pressure means so that said movable member is maintained in a position of equilibrium when said forces exerted by said support devices and said pressure means are substantially in equilibrium, means for sensing displacement of said movable member from said equilibrium position, and means responsive to said sensing means for restoring the forces exerted by said support devices and said pressure means substantially to equilibrium so that loading of said bearing means is substantially minimized.

12. A rolling mill according to claim 11 wherein said pressure means is operated by a pressurized fluid and wherein said support devices are operated by a pressurized fluid and are connected into groups with at least one support device in each group, said rolling mill further including conduit means for supplying each of said groups with said pressurized fluid and means for separately regulating the pressure of the fluid supplied to each of said groups of support devices.

13. A rolling mill according to claim 11 wherein said support devices are hydrostatic support elements movably disposed in said core and wherein said pressure means include a plurality of pressure members.

14. Apparatus according to claim 12 wherein said force exerting means includes a plurality of force exerting elements, each of said elements of said plurality being coupled with one of said groups of support devices so that the force exerted by each element on said movable member is responsive to and simulates the aggregate force exerted by the support devices of the associated group and at least one other element for exerting a force on said movable member which opposes the forces exerted thereon by said elements of said plurality of elements, said other element being coupled with said pressure means so that the force exerted by said other element on said movable member is responsive to and simulates the force exerted by said pressure means.

15. Apparatus according to claim 14 wherein said force exerting elements of said plurality of elements are pressure elements operated by a pressurized fluid the pressure of which is dependent on the pressure of the pressurized fluid supplied to the associated group of support devices and wherein said other pressure element is operated by pressurized fluid the pressure of which is dependent on the pressure of the fluid acting on said pressure means.

16. Apparatus according to claim 15 including further means for regulating the pressure of the fluid supplied to each of said groups of support devices, each further regulating means being connected with an associated pressure element of said plurality of elements and responsive to the pressure of the fluid acting thereon, and means for regulating the pressure of the fluid supplied to said pressure means, the last-mentioned regulating means being connected with said other pressure element and responsive to the pressure of the fluid acting thereon.

17. Apparatus according to claim 16 wherein said means for regulating said pressure means is coupled with and responsive to said sensing means.

18. Apparatus according to claim 11 including further means for exerting a force on said movable member which simulates the deadweight of said deflection compensating roll.

19. An apparatus for controlling a deflection compensating press roll having a support core, a roll shell rotatably mounted about the support core, bearing means disposed between the shell and the core adjacent the shell ends, a plurality of support devices engaged between the core and the roll shell to exert forces therebetween, said support devices being operated by a pressurized fluid and connected into groups with at least one support device in each group, means for separately regulating the forces exerted by the support devices of each group, and pressure means for exerting forces on the ends of the core which oppose the forces exerted on the core by said support devices, said control apparatus comprising a frame, a movable member disposed in said frame, a plurality of pressure elements each coupled with one of said groups for exerting first forces on said movable member which simulate the forces exerted by said groups respectively, a pair of pressure elements coupled with said pressure means respectively for exerting second forces on said movable member which simulate respective forces exerted by the pressure means on the ends of the core, said second forces opposing said first forces on the movable member, said movable member being in a position of equilibrium when said opposing forces are in a predetermined relationship, means for sensing displacement of said movable member from said equilibrium position, and means responsive to said sensing means for changing the relative forces exerted by said support devices and said pressure means to restore the movable member substantially to said equilibrium position.

20. A rolling mill comprising at least two press rolls at least one of which is a deflection compensating press roll having a support core, a roll shell rotatably mounted about the support core, bearing means disposed between the shell and the core adjacent the shell ends, a plurality of support devices engaged between the core and the roll shell to exert forces therebetween, said support devices being operated by a pressurized fluid and connected into groups with at least one support device in each group, means for separately regulating the force exerted by the support devices of each group, pressure means for pressing said rolls against each other, and a control apparatus having a frame, a movable member disposed in said frame, a plurality of pressure elements each coupled with one of said groups for exerting first forces on said movable member which simulate the forces exerted by said groups respectively, a pair of pressure elements coupled with said pressure means for exerting second forces on said movable member which simulate respective forces exerted on said bearing means adjacent respective shell ends, said second forces opposing said first forces on the movable member, said movable member being in a position of equilibrium when said opposing forces are in a predetermined relationship, means for sensing displacement of said movable member from said equilibrium position, and means responsive to said sensing means for changing the relative forces exerted by said support devices and said pressure means to restore the movable member substantially to said equilibrium position.

* * * * *